United States Patent
Lalonde et al.

(10) Patent No.: US 10,008,002 B2
(45) Date of Patent: Jun. 26, 2018

(54) SINGLE-CAMERA DISTANCE ESTIMATION

(75) Inventors: Jeffrey Lalonde, Ottawa (CA); Luc Martel, Ottawa (CA); Robert Laganiere, Gatineau (CA)

(73) Assignee: NXP Canada, Inc., Toronto, Ontario (CA)

(*) Notice: Subject to any disclaimer, the term of this patent is extended or adjusted under 35 U.S.C. 154(b) by 492 days.

(21) Appl. No.: 13/208,919

(22) Filed: Feb. 28, 2012

(65) Prior Publication Data

US 2013/0222589 A1 Aug. 29, 2013

(51) Int. Cl.
*H04N 7/18* (2006.01)
*G06T 7/579* (2017.01)
*G08G 1/16* (2006.01)

(52) U.S. Cl.
CPC ............ *G06T 7/579* (2017.01); *G08G 1/165* (2013.01); *G08G 1/168* (2013.01); *G06T 2207/10016* (2013.01); *G06T 2207/20164* (2013.01); *G06T 2207/30261* (2013.01)

(58) Field of Classification Search
CPC ......... G06T 7/579; G08G 1/165; G08G 1/168
USPC .......................................................... 348/148
See application file for complete search history.

(56) References Cited

U.S. PATENT DOCUMENTS

| | | | |
|---|---|---|---|
| 6,144,701 A * | 11/2000 | Chiang et al. | 375/240 |
| 2007/0154068 A1* | 7/2007 | Stein et al. | 382/106 |
| 2009/0279740 A1* | 11/2009 | Yamazaki | 382/106 |
| 2010/0245571 A1* | 9/2010 | DeVoe | 348/145 |
| 2011/0018700 A1* | 1/2011 | Stein et al. | 340/436 |
| 2012/0147149 A1* | 6/2012 | Liu et al. | 348/50 |
| 2012/0262543 A1* | 10/2012 | Lee et al. | 348/43 |
| 2014/0169627 A1* | 6/2014 | Gupta | G06K 9/00805 382/103 |

OTHER PUBLICATIONS

Andreas Wedel, Uwe Franke, Jens Klappstein, Thomas Brox & Daniel Cremers—Realtime Depth Estimation and Obstacle Detection from Monocular Video, DAGM 2006, LNCS 4174, Heidelberg 2006—pp. 475-484.

Andreas Wedel, Thomas Schoenemann, Thomas Brox & Daniel Cremers—WarpCut—Fast Obstacle Segmentation in Monocular Video, Computer Vision Group University of Bonn.

Guanglin Ma, Manoj Dwivedi, Ran Li, Chong Sun & Anton Kummert—A Real-Time Rear View Camera Based Obstacle Detection—Proceedings of the 12th International IEEE Conference on Intelligent Transportation Systems, St. Louise, MO, U.S.A., Oct. 3-7, 2009. (978-1-4244-5521-8/09) pp. 408-413.

Changhui Yang, Hitoshi Hongo, & Shinichi Tanimoto—A New Approach for In-Vehicle Camera Obstacle Detection by Ground Movement Compensation—Proceedings of the 11th International IEEE Conference on Intelligent Transportation Systems, Beijing, China, Oct. 12-15, 2008. (1-4244-2112-1/08) pp. 151-156.

* cited by examiner

*Primary Examiner* — On S Mung

(57) ABSTRACT

Systems and methods for estimating distances to objects or features are described. The distance estimation tracks features across images captured from a single camera mounted to an automobile and determines features that are off-ground. Features are tracked based on a ground motion estimate and respective motion of the features tracked across two or more successive images. For each off-ground feature a distance to the camera is calculated based on motion of the feature in the images captured by the camera projected to a ground-plane and the ground motion estimate.

18 Claims, 9 Drawing Sheets

(A)

(B)

(A)

(B)

(A)

(B)

SINGLE-CAMERA DISTANCE ESTIMATION

TECHNICAL FIELD

The current description relates to determining a distance to an object from images captured from single camera, and in particular to a system to be used in an automobile for determining a distance to an obstacle.

BACKGROUND

The use of camera systems in automobiles is becoming more common. The camera systems can provide views from different locations of the automobile. For example, the cameras may be used to provide a blind-spot view or a rear view to assist drivers when reversing.

Without additional sensors it is difficult to determine a distance to an object from images captured from a single camera. As such, if a camera system is to provide distance information to an object, for example a distance to a parked car when reversing, additional sensors have been required, including range finding sensors using sonar, or additional cameras to provide stereoscopic information. These additional sensors can be costly and increase the installation time of the system.

It is desirable to have a single camera system that can provide distance information to one or more objects.

SUMMARY

In accordance with the present disclosure there is provided a method for determining a distance to an obstacle from a camera mounted to an automobile, the method comprising tracking a plurality of features across two or more successive images; identifying off-ground features from the tracked plurality of features based on a ground motion estimate and respective motion of the plurality of features tracked across two or more successive images; and calculating for each off-ground feature of the plurality of features a distance to the camera based on motion of the feature in the images captured by the camera projected to a ground-plane and the ground motion estimate.

In accordance with the present disclosure there is further provided a processor for executing instructions stored in memory, the processor for determining a distance to an obstacle from a camera mounted to an automobile, the instructions configuring the processor to track a plurality of features across two or more successive images; identify off-ground features from the tracked plurality of features based on a ground motion estimate and respective motion of the plurality of features tracked across two or more successive images; and for each off-ground feature, calculate a distance to the camera based on motion of the feature in the images captured by the camera projected to a ground-plane and the ground motion estimate.

In accordance with the present disclosure there is further provided a system for determining a distance to an obstacle, the system comprising a camera to be mounted to an automobile; a memory for storing instructions; and a processor for executing instructions. The processor is for determining a distance to an obstacle from the camera when mounted to the automobile. The instructions configure the system to track a plurality of features across two or more successive images; identify off-ground features from the tracked plurality of features based on a ground motion estimate and respective motion of the plurality of features tracked across two or more successive images; and for each off-ground feature, calculate a distance to the camera based on motion of the feature in the images captured by the camera projected to a ground-plane and the ground motion estimate.

BRIEF DESCRIPTION OF THE DRAWINGS

Embodiments are described herein with references to the appended drawings, in which.

DETAILED DESCRIPTION

Figure 1:
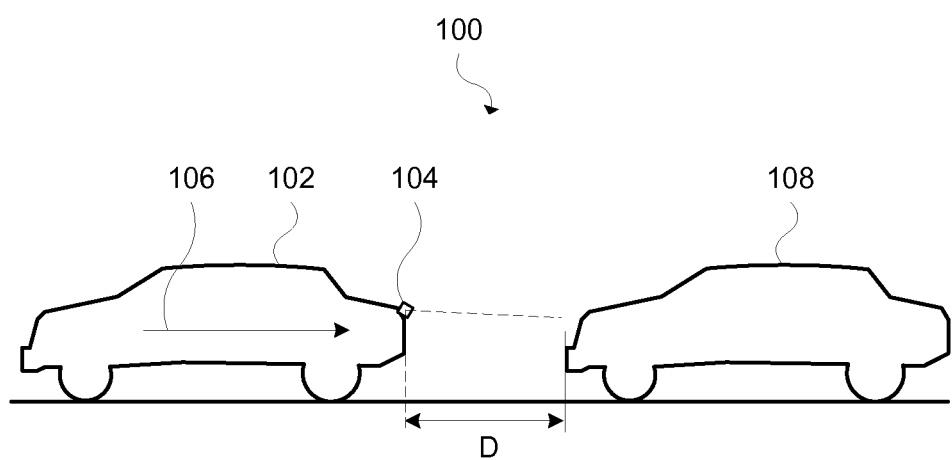
FIG. 1 depicts in a schematic an environment for estimating a distance to an object using a single camera.

FIG. 1 depicts in a schematic an environment for estimating a distance to an object using a single camera. As depicted, the environment 100 comprises a first automobile 102 that includes a camera 104 capturing successive images. The automobile 102 is depicted as moving in a direction 106 towards a second automobile 108. The camera 104 is positioned to point in the direction of movement 106. The situation depicted in FIG. 1 may represent a common scenario of reversing into a parking space. The images captured from the camera 104 may be presented to the driver of automobile 102 to assist the driver in parking the automobile 102. It is desirable to provide information to the driver about the distance 'D' to the parked automobile 108, in addition to the images from the camera 104. Once the distance D has been estimated it may be provided to the driver in various ways, including displaying the distance information in an overlay on top of the captured images, providing an audio announcement or alert of the distance D. Additionally or alternatively, the estimated distance information may be used to assist the driver in controlling the automobile 102, for example by applying brakes if the distance D is small and the automobile is still reversing quickly.

As described further herein, the images captured from the single camera are processed in order to estimate a distance to an object. The objects to which the distance is estimated will be located above the ground and as such present an obstacle to the automobile. The processing of the images locates points or features in the images and uses the motion of the points or features to estimate a height and distance to the camera of the corresponding objects in the real-world. Features or points that are above the ground plane may be identified and used to estimate the distance to the corresponding objects which would be considered as an obstacle.

Figure 2:
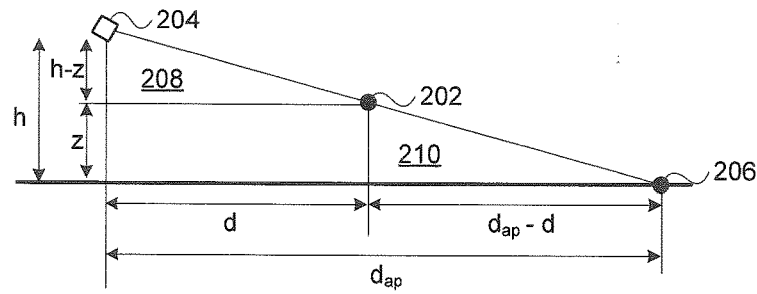
FIG. 2 depicts in a line drawing a representation of estimating a distance to an object located above the ground using images captured from a single camera.
Figure 2:
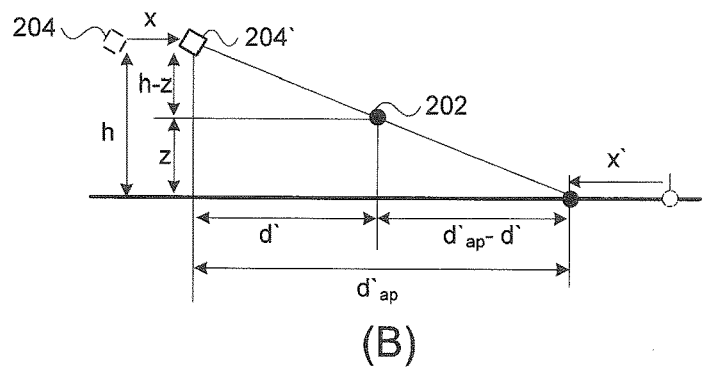

FIG. 2 depicts in a line drawing a representation of estimating a distance to an object located above the ground using images captured from a single camera. FIG. 2 (A) depicts positions of the camera 204 and an object 202 at a first time an image is captured, and FIG. 2 (B) depicts positions of the camera 204' and the object 202 at a second time a successive image is captured.

In FIG. 2 the camera is located a known height 'h' above the ground. An object 202 is located at a horizontal distance 'd' from the camera and a height 'z' above the ground and is assumed to be stationary. The projection of the object 202 to the ground from the camera's perspective is at apparent object location 206. The apparent object location 206 is at a greater horizontal distance '$d_{ap}$' from the camera than the object 202. Due to similar triangles 208 and 210, the horizontal distance to the apparent object location is given by:

$$d_{ap} = s_z d \quad (1)$$

Where:

$$s_z = \frac{1}{1 - \frac{z}{h}} \quad (2)$$

since $$\frac{d_{ap} - d}{d} = \frac{z}{h - z}$$

From the above, it is clear that the apparent object location $d_{ap}$ of the projection of the object to the ground from the camera's perspective is proportional to the actual object location d and scaled by $s_z$. As depicted in FIG. 2 (B) when the camera moves by a distance 'x' the apparent object location, which is projected onto the ground, moves by an apparent distance of x' Assuming that the height z of the object remains constant, and taking the first derivative with respect to time of (1), an apparent velocity, relative to the camera, of an object projected to the ground plane, $v_{ap}$, is proportional to the horizontal velocity of the object, v, scaled by $s_z$.

$$v_{ap} = s_z v \quad (3)$$

From (2) and (3), when the velocities v and $v_{ap}$ are known then the actual height of the object z is given by:

$$z = \left(1 - \frac{v}{v_{ap}}\right) h \quad (4)$$

From (1) and (3), when the velocities v and $v_{ap}$ are known then the actual horizontal distance of the object to the camera is given by $$d = \left(\frac{v}{v_{ap}}\right) d_{ap} \quad (5)$$

From (4) and (5) it is clear that a distance from the camera to an object can be determined from successive images captured from a single camera. In order to determine the distance, the actual horizontal velocity of the camera, and the apparent velocity of the projection of the object to the ground plane from the camera's perspective should be known. Although described with respect to velocities it will be apparent that the time between successive images is not critical. As such, as long as there is sufficient displacement of the object in successive images as projected to the ground plane, the distance to the object can be determined.

If the object is stationary, the horizontal velocity of the camera relative to the object will be equal in magnitude to the horizontal velocity of the camera itself. Since the camera is mounted to the automobile, the camera velocity will be equal to the automobile. As such, the velocity of the camera may be determined from sensors that determine the velocity of the automobile. Although it is possible to determine the velocity of the camera from sensors, it is also possible to determine the velocity from images captured from the camera, as described further herein.

Figure 3:
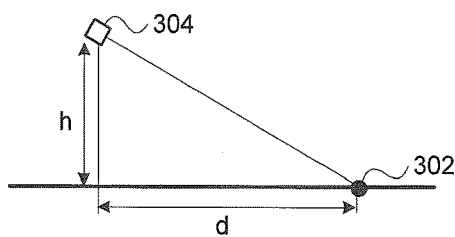
FIG. 3 depicts in a line drawing a representation of estimating a distance to an object located on the ground using images captured from a single camera.
Figure 3:
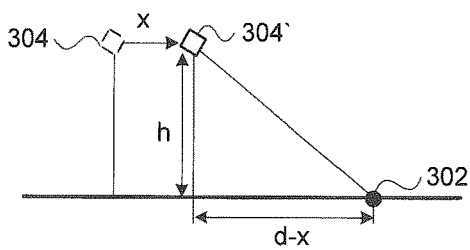

FIG. 3 depicts in a line drawing a representation of estimating a distance to an object located on the ground using images captured from a single camera. FIG. 3 (A) depicts an object located on the ground captured from a camera position 304 at a first time and FIG. 3 (B) depicts the same object 302 captured from a camera position 304' at a second time. Since the object 302 is located on the ground, the projection of the object to the ground will have the same velocity of the actual object. The velocity of the ground objects is given by:

$$v = \frac{d_2 - d_1}{t_2 - t_1} \quad (6)$$

Where:

$$d_1 = d$$

$$d_2 = d - x \quad (7)$$

Combining (6) and (7) it is determined that the velocity of the ground points is the same as the velocity of the camera:

$$v = \frac{x}{\Delta t} \quad (8)$$

As such, it is possible to determine the velocity of the camera, which may be used to calculate the actual velocity of objects located above the ground, from the velocity of points on the ground. Further from (3), and assuming that all of the objects are located on or above the ground, the actual velocity of objects will always be less than or equal to the apparent velocity of the objects when projected to the ground, that 25 is, objects above the ground will appear to move faster than objects on the ground, when the objects are projected to the ground plane from the point of view of the camera.

Figure 4:
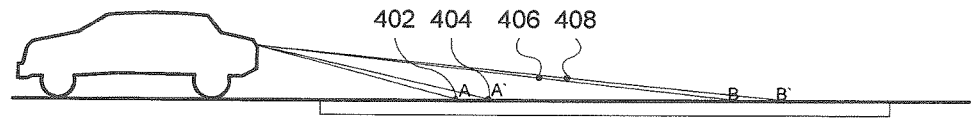
FIG. 4 depicts the use of a single camera to estimate a distance to an obstacle in an automobile system.
Figure 4:
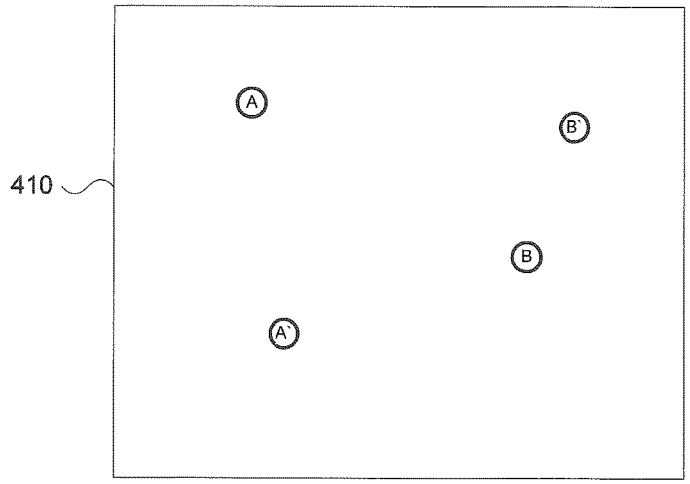
Figure 4:
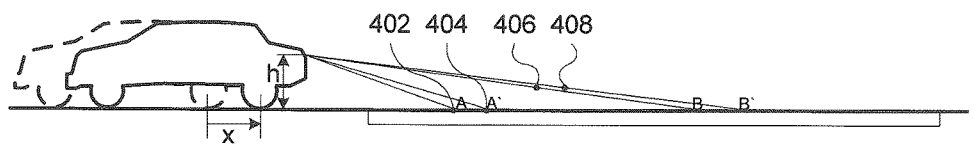
Figure 4:
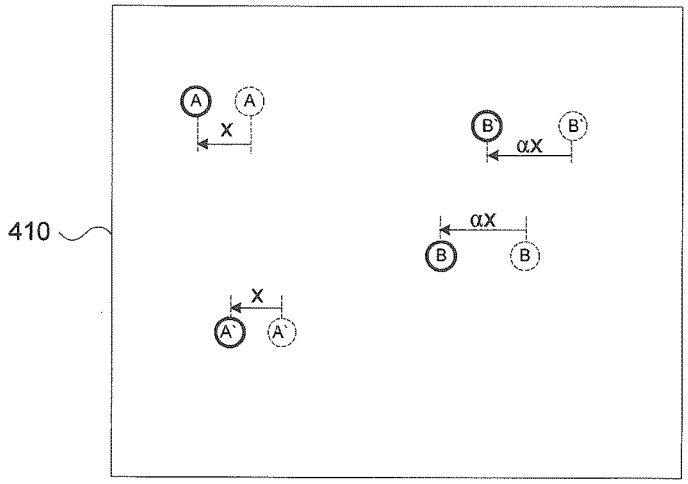

FIG. 4 depicts the use of a single camera to estimate a distance to an obstacle in an automobile system. In FIG. 4, 4 objects are depicted, namely 2 ground objects 402, 404 and two off-ground objects 406, 408. A camera captures images of the location of the objects. The images may be processed in order to project all of the points to the ground plane from the camera's point of view. This results in a top-view image 410 which depicts the ground-projected locations A, A', B, B' of the objects 402, 404, 406, 408 respectively.

As depicted in FIG. 4 (B) when the camera moves by a distance x in between successively captured images, the projected points A, A', B, B' will move by an amount dependent upon the height of the corresponding object above the ground. That is points on the ground will move by a corresponding amount x, while points above the ground will move by an amount αx, where α is based on the height of the object above the ground and the height of the camera above the ground.

Figure 5:
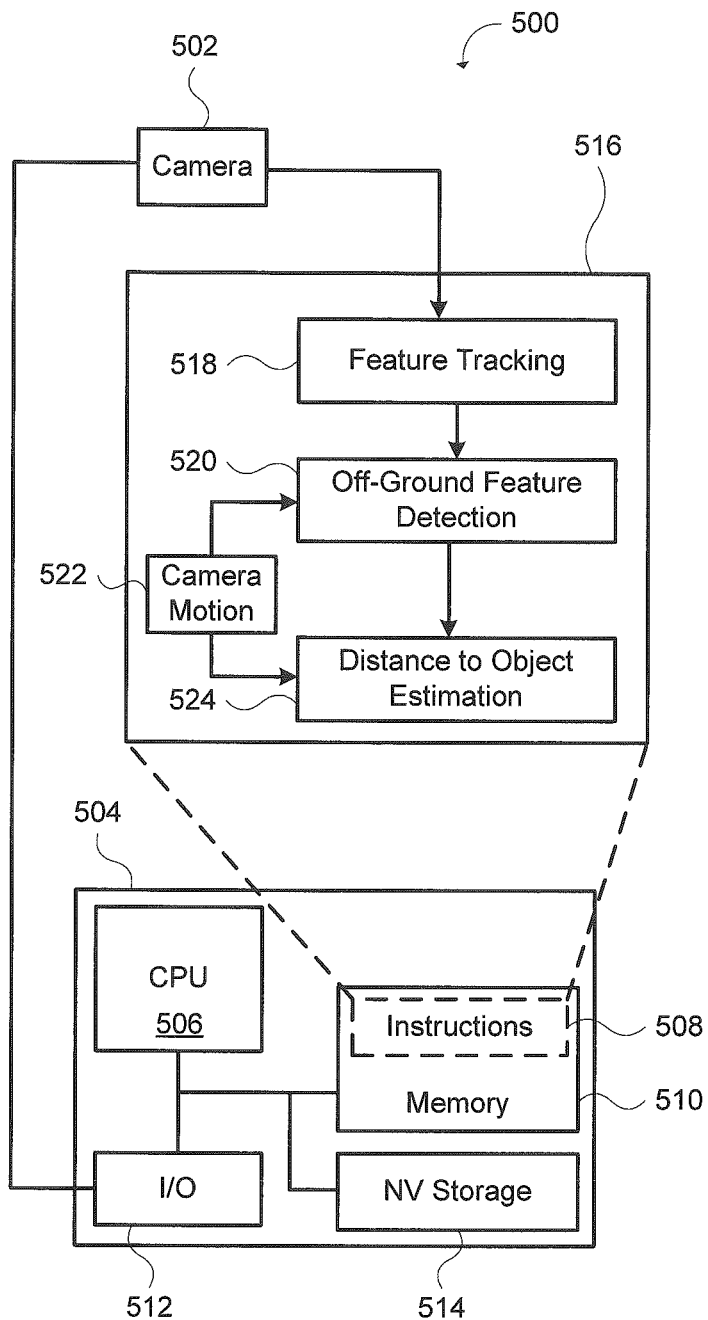
FIG. 5 depicts in a block diagram an illustrative embodiment of a system for estimating a distance to an object using a single camera.

From FIG. 4, it is clear that if corresponding points associated with objects are tracked across successive frames or images it is possible to determine the velocities of the points and associated objects. Once the velocities of the points are determined, the actual velocity, v, and the apparent velocity, $v_{ap}$, may be determined. As an example, the actual velocity may simply be determined by the smallest velocity of the tracked points. Once v and $v_{ap}$ are determined, the horizontal distance to the objects corresponding to the points may be determined as well as their heights above the ground according to equations (4) and (5). It is noted that both equations (4) and (5) include ratios of the velocities, as such, the actual time elapsed between frames does not need to be known. FIG. 5 depicts in a block diagram an illustrative embodiment of a system for estimating a distance to an object using a single camera. The system 500 comprises a camera 502 that captures successive images from a known height above the ground. The camera captures images at a known frame rate so that a time between successive images is known. It is contemplated that the frame rate of the camera 502 may vary. The system 500 further comprises a processing device 504, which is depicted as a general purpose computing device comprising a central processing unit (CPU) 506 for executing instructions 508 stored in memory 510. The processing device may include an input/output (I/O) component 512 for coupling the processing device 504 to other components, including the camera. The processing device 504 may also include non-volatile (NV) storage 514 for storing information, possibly including the instructions 508. The instructions 508 when executed by the CPU 506 configure the processing device 504 to provide a distance estimation component 516 that provides an estimation of a distance to an object from successive images captured from the single camera.

The distance estimation component 516 receives successive images, tracks features across the images and determines distances to the objects corresponding to the tracked features. Features may be considered as a small area surrounding a point in an image that can be located in the successive images. The distance estimation component 516 comprises a feature tracking component 518 that locates and tracks features across the successive images. The distance estimation component 516 may further comprise an off-ground feature detection component 520 that determines if the tracked feature corresponds to an off-ground feature. The off-ground feature detection component 520 may use the apparent motion, whether velocities or distances, of each of the tracked features across successive images, as well as the camera motion 522. The camera motion 522 may be provided from an external device or sensor, or may be estimated from the successive images as described further herein.

The tracked features that are determined to be off the ground may be used by a distance to object estimation component 524 that uses the camera motion 524 as well as the apparent velocities of the determined off-ground features to determine the distance from the camera to the objects corresponding to the off-ground features. The distance to the objects may be estimated according to equations (4) and (5).

Once the distances to the objects corresponding to tracked off-ground features are determined, the information may be presented or used in various ways. For example, the closest object may be determined and the distance information displayed on an overlay of the captured image. Although the distance estimation has been described with regards to off-ground features corresponding to objects that are above the ground, it is contemplated that the distance to objects on the ground could also be estimated.

As will be apparent the distance estimation component 500 may be implemented in numerous ways. Various possible embodiments are described further below, although other implementations are possible.

Figure 6:
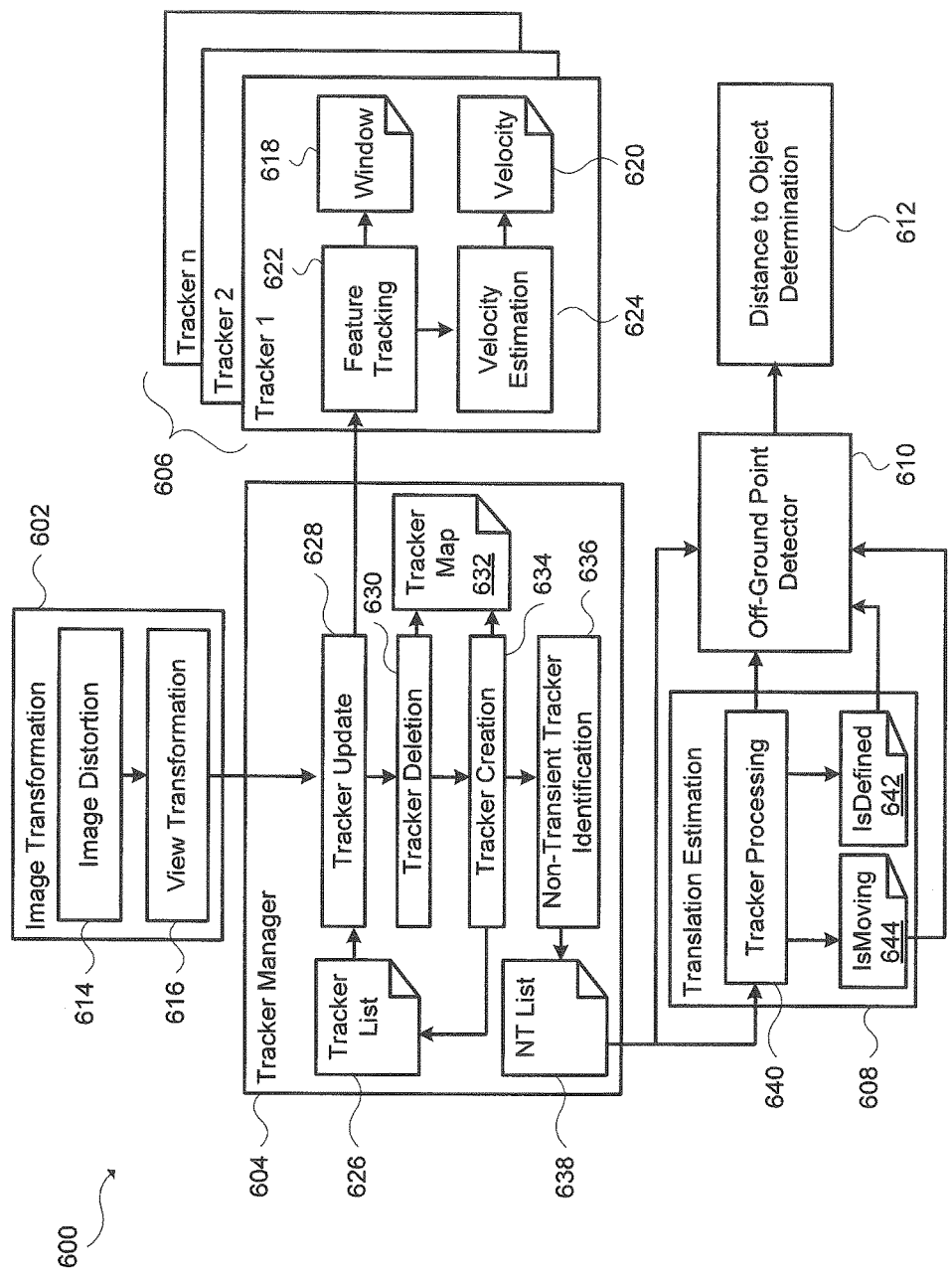
FIG. 6 depicts in a block diagram a further illustrative embodiment of a system for estimating a distance to an object using a single camera.

FIG. 6 depicts in a block diagram a further illustrative embodiment of a distance estimation component. The distance estimation component 600 may provide the functionality of the distance estimation component 516. Although not depicted in FIG. 6, the distance estimation component 600 may be implemented in a processing device, such as general purpose computing device 504 of FIG. 5. The distance estimation component 600 comprises an image transformation component 602, a tracker manager 604, one or more trackers 606, a translation estimation component 608, an off-ground point detector 610, and a distance to object determination component 612.

The input images, which correspond to successive frames of a video stream from a single camera, are provided to the image transformation component 602. The image transformation component comprises an image distortion component 614 and a view transformation component 616. The image distortion component 614 corrects the received image for any lens distortion. For example, a wide angle lens may provide a 'fish-eye' image which can be undistorted. The undistorted image is provided to the view transformation component 616, which transforms the undistorted image captured from the camera, located a known distance above the ground to a top-view image. The top-view image corresponds to the undistorted captured image with all of the points in the image projected to the ground plane from the camera's point of view. The view transformation component 616 may only transform a portion of the undistorted captured image to the top-view image.

Figure 7:
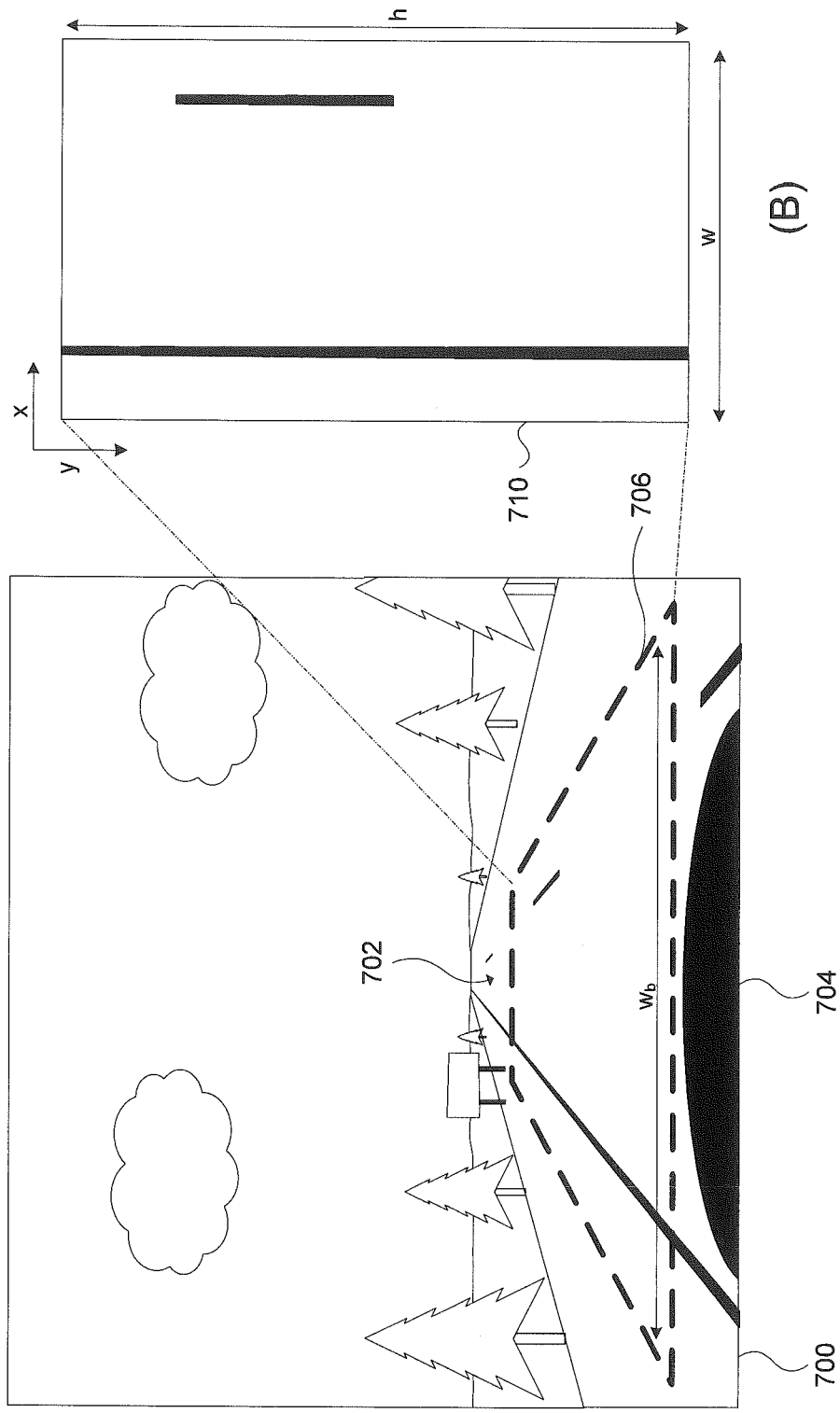
FIG. 7 depicts in an illustration of transformation between the undistorted captured image and the corresponding top-view image.

The transformation between the undistorted captured image and the corresponding top-view image is depicted in FIG. 7. FIG. 7(A) depicts in a line drawing a captured image 700 of a road 702 captured from a camera mounted to an automobile. A portion 704 of the automobile may be visible in the captured image. A region of interest (ROI) that will be transformed to the top-view image is depicted as dashed box 706. FIG. 7(B) depicts the top-view image 710 corresponding to the ROI 706.

Generating the top-view image from of an image taken from a camera that is tilted with respect to the ground comprises warping the image such that it appears to been taken from above. FIG. 7 depicts the transformation between the undistorted captured image and the corresponding top-view image. FIG. 7(A) depicts in a line drawing an undistorted captured image 700 of a road 702 captured from a camera mounted to an automobile. The undistorted image corrects for lens distortion in the captured image. A portion 704 of the automobile may be visible in the captured image. A region of interest (ROI) that will be transformed to the top-view image is depicted as dashed box 706. FIG. 7(B) depicts the top-view image 710 corresponding to the ROI 706.

Generating a top image amounts to determining a pixel-to-pixel mapping between the top image to the tilted image captured from the image capture device. This mapping can be broken down conceptually into four steps depicted in FIG. 8.

1—A top-view pixel (A) is mapped to a point on the ground (B);
2—The point on the ground (B) is mapped to a point on the undistorted image plane (C);
3—The undistorted point (C) is mapped to its distorted location on the ideal image plane (D); and
4—The distorted point on the ideal image plane (D) is mapped to a pixel in the input image (E).

Figure 8:
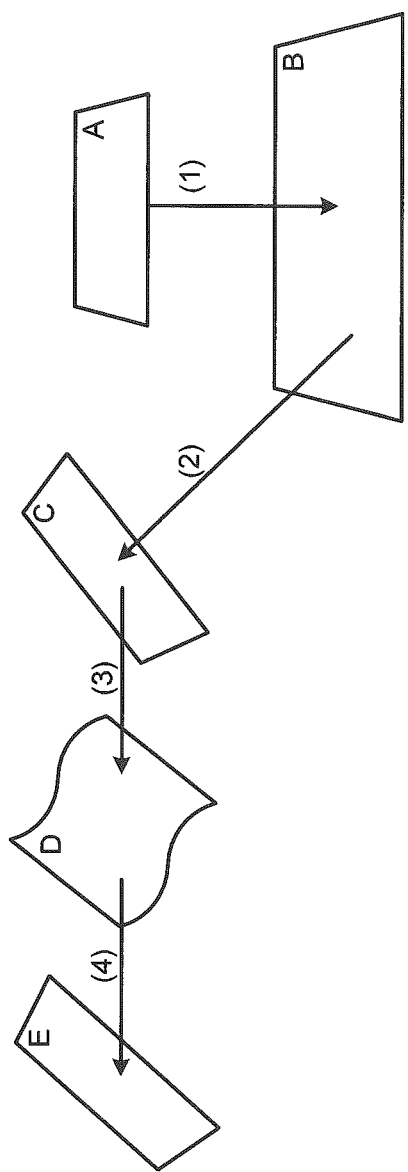
FIG. 8 depicts in a schematic the association between input images and top-view images.

This conceptual breakdown is chosen because it provides relations between points and distances in either the input or top image to points and distances in the real world. In FIGS. 8, (A) and (E) are images using pixel coordinates, (C) and (D) are image planes in the camera reference frame, and (B) is the ground plane in the world reference frame.

1—Mapping the Top Image to the Ground Plane

The top view image is a scaled and shifted representation of the ground plane. The mapping from the top view image (A) to the ground plane (B) is a homography of the form $$H_1 = \begin{bmatrix} s_x & 0 & t_x \\ 0 & s_y & t_y \\ 0 & 0 & 1 \end{bmatrix} \qquad (9)$$

This transformation has the same form as a camera matrix, which reflects the fact that the top image mimics a virtual camera pointing straight down to the ground.

A mapping from top-view pixel (x,y) to ground is then given by $$m_1(x,y)=(s_x x+t_x, s_y x+t_y) \qquad (10)$$

2—Mapping the Ground Plane to the Undistorted Image Plane

The mapping from the ground plane (B) to the undistorted image plane (C) is a general homography is then given by:

$$H_2 = \begin{bmatrix} h_{11} & h_{12} & h_{13} \\ h_{21} & h_{22} & h_{23} \\ h_{31} & h_{32} & h_{33} \end{bmatrix} \qquad (11)$$

This homography depends exclusively on the orientation and position of the camera in world coordinates. A mapping from the ground point (X,Y) to the undistorted image plane (C) is then given by:

$$m_2(X,Y)=(p_1/p_3, p_2/p_3) \qquad (12)$$

where $$\begin{bmatrix} p_1 \\ p_2 \\ p_3 \end{bmatrix} = H_2 \begin{bmatrix} X \\ Y \\ 1 \end{bmatrix} \qquad (13)$$

3—Mapping the Undistorted Image Plane to the Distorted Image Plane

The precise form of the mapping from the undistorted image plane (C) to the distorted plane (D) depends on the distortion model used when calibrating the camera. For example, a distortion model which compensates for radial and tangential distortion may be used. In such a distortion model, there are six radial distortion coefficients ($k_1 \ldots k_6$) and two tangential distortion coefficients ($p_1$, $p_2$). The mapping from a point (x,y) in the undistorted image plane (C) to the distorted image plane (D) is given by:

$$m_3(x, y) = (D_x(x, y), D_y(x, y)) \qquad (14)$$

where $$D_x(x, y) = k_r x + 2p_1 xy + p_2(3x^2 + y^2),$$

$$D_y(x, y) = k_r y + p_1(x^2 + 3y^2) + 2p_2 xy,$$

$$k_r = \frac{1 + k_3 r^3 + k_2 r^2 + k_1 r}{1 + k_6 r^3 + k_5 r^2 + k_4 r} \text{ and } r = x^2 + y^2$$

4—Mapping the Distorted Image Plane to the Input Image

Mapping the distorted image plane to the input image involves the intrinsic camera parameters. Let the camera matrix be $$C = \begin{bmatrix} f_x & 0 & c_x \\ 0 & f_y & c_y \\ 0 & 0 & 1 \end{bmatrix} \qquad (15)$$

Then a point (x, y) in the distorted image plane is mapped to an input image pixel by:

$$m_4(x,y)=(f_x x+c_x, f_y y+c_y) \qquad (16)$$

Overall Top Image to Input Image Mapping

For a top image of width w and height h, the top view pixel to input pixel mapping is given by $$(x',y')=m_4(m_3(m_2(m_1(x,y)))) \text{ for } x=0,1,\ldots,w-1 \text{ and } y=0,1,\ldots,h-1 \qquad (17)$$

That is, pixel (x,y) in the top view image is mapped to pixel (x', y') in the input image. Since top view pixels rarely map to the center of input pixels, bi-linear interpolation may be used to estimate the value of any given top view pixels.

The parameters for mapping between the input image and the top view image are described further below.

To determine the elements of $H_1$, area of the ground to view is defined. Without loss of generality, the world ground plane is set as the Z=0 plane, and the ground ROI is aligned with the X and Y axes. The ground ROI can be defined by its upper-left corner ($X_o$, $Y_o$), its width W and height H.

Further, the top-view image size is defined. If the top image has a width w and height h, then:

$$s_x=W/w, s_y=H/h, t_x=X_o, t_y=Y_0 \qquad (18)$$

The general homography $H_2$ depends on the camera's orientation and location with respect to the world coordinate system. Because it relates the ground to the undistorted image plane, neither the camera matrix nor the distortion coefficients have anything to do with $H_2$. The ground ROI is also independent of $H_2$. Only the camera's physical positioning matters.

As noted above, the world ground plane is the Z=0 plane. In addition, the Z-axis is pointed down into the ground so that a camera pointing straight towards the ground will have its z-axis aligned with the world's z-axis.

For a camera of height $h_c$ above the ground, the camera is located at $\vec{t}_c=[0,0,-h_c]^T$ in world coordinates. The Z coordinate is negative because the Z-axis points into the ground.

The optical axis of the camera is tilted away from the world Z-axis by a negative rotation about the X-axis. A tilt angle of θ is achieved by the transformation:

$$R_\theta = \begin{bmatrix} 1 & 0 & 0 \\ 0 & \cos\theta & \sin\theta \\ 0 & -\sin\theta & \cos\theta \end{bmatrix} \quad (19)$$

With this scheme, θ=0 means the camera is pointing straight down, so that the optical axis aligns with world Z-axis, θ=90 means the camera is pointing at the horizon, so that the optical axis aligns with world negative Y-axis, and θ=180 means the camera is pointing straight up, so that the optical axis aligns with world negative Z-axis.

In addition, a swing angle may be added to the camera to compensate the image if the horizon is not horizontal in the captured image. A swing angle of φ is achieved by a rotation about the z-axis in the camera reference frame:

$$R_\varphi = \begin{bmatrix} \cos\varphi & -\sin\varphi & 0 \\ \sin\varphi & \cos\varphi & 0 \\ 0 & 0 & 1 \end{bmatrix} \quad (20)$$

The combined rotation matrix of the camera is the tilt followed by the swing:

$$R = R_\varphi R_\theta \quad (21)$$

Letting $P=[X,Y,Z,1]^T$ be the homogeneous coordinates of a point in the world, and Q be the point's coordinates in the camera coordinate system. If a vector is defined $\vec{T}=-R\vec{t}_c$, then the transformation from world coordinates to camera coordinates is given by:

$$\vec{Q}=[R\,\vec{T}]\vec{P} \quad (22)$$

Denoting the $i^{th}$ column of R as $\vec{r}_i$, (22) can be rewritten as:

$$\begin{bmatrix} x \\ y \\ z \end{bmatrix} = \begin{bmatrix} \vec{r}_1 & \vec{r}_2 & \vec{r}_3 & \vec{T} \end{bmatrix} \begin{bmatrix} X \\ Y \\ Z \\ 1 \end{bmatrix} \quad (23)$$

Because all points on the ground have a zero Z coordinate, the rigid transformation is reduced to the homography:

$$\begin{bmatrix} x \\ y \\ z \end{bmatrix} = \begin{bmatrix} \vec{r}_1 & \vec{r}_2 & \vec{T} \end{bmatrix} \begin{bmatrix} X \\ Y \\ 1 \end{bmatrix} \quad (24)$$

However, $\vec{T}=-h_c\vec{r}_3$. So the homography relating the ground plane to the undistorted image plane is given by:

$$H_2 = [\vec{r}_1\,\vec{r}_2\,h_c\vec{r}_3].$$

Returning to FIG. 6, the tracker manager component 604 manages a plurality of trackers 606. Each tracker may be a feature tracker that is used to track a feature or a point across successive images, which may be top view images generated as described above. Each tracker 606 includes a window 618 which is a region of interest surrounding the point or center of the feature being tracked by the tracker. Each tracker also comprises an estimate of the velocity 620 of the point being tracked. The trackers include functionality for tracking the feature 622 as well as estimating the velocity 624 of the tracked point. The velocity estimation functionality 624 may be provided by a 2D constant velocity Kalman filter.

The window of each tracker is updated by performing an exhaustive template match within N×M pixels of the window's current center in the current image. The feature tracking may compute the normalized squared difference at every point in the search region. The window 618 of the tracker is then moved to the point yielding the minimum normalized squared difference. The new window center is used to update the Kalman filter and so the velocity estimate for the tracked point.

An exhaustive search was described for simplicity. More efficient methods, such as the mean shift or pyramidal KLT tracker, could used if sufficient processing power is available.

As described above, trackers 606 can track a feature across successive images. The tracker manager 604 manages the plurality of trackers as described further below. The tracker manager maintains a list of current trackers 626. The tracker manager 604 performs the tracker management upon receiving each successive image and a tracker update component 628 updates the trackers on the tracker list 626.

Once all of the trackers on the list 626 are updated, a tracker deletion component 630 removes any noisy trackers, which are trackers that are moving erratically, as well as trackers that are near the edge of the image. The tracker deletion component 630 updates a tracker map 632 which is a mask indicating where trackers do and do not exist. For example, the tracker map may be an image that is black wherever a trackers window exists and white if no tracker windows occupy the area.

After the tracker deletion and updating of the tracker map, a tracker creation component 634 processes the current image to detect good features to track in the current image, or more particularly, in the portion of the current image where no trackers currently exist as indicated by the tracker map 632. The detection of good features to track may be provided in various ways. For example OpenCV (Open Source Computer Vision) provides a function OpenCV::goodFeaturesToTrack( ) which determines strong corners, which are treated as features to track, in an image. Some functions for determining features, including OpenCV::goodFeaturesToTrack( ), may provide a 'best' feature to track in an image. These functions may be modified in order to only provide a feature if it is above a certain threshold. In the case of OpenCV::goodFeaturesToTrack( ), the functionality is modified so that the quality criteria for a corner to be accepted is absolute, rather than relative to the best observed corner. This way, if there are no good corners in what remains of the tracker map, no corners are returned, whereas they would be without the modification. For each good tracking feature a new tracker is created and the tracker list 626 and the tracker map 632 is updated accordingly.

A non-transient tracker identification component 636 adds any trackers that have existed on the tracker list for more than 10 successive frames to a non-transient tracker list 638. The trackers on the non-transient list are considered stable and are used for subsequent processing.

A translation estimation component 608 processes the trackers on the non-transient list 638 to provide an estimate of the camera motion. It is assumed that the vehicle motion is strictly translational, that is there is no turn angle. As a result of only, vertical motion in the top-view image needs to be considered, simplifying the description. It is noted that the motion is referred to vertical motion with respect to the top-view image since it corresponds to movement along the y-axis of the top-view image. The vertical motion in the top-view image may correspond to horizontal motion in the real world. The translation estimation component 608 may incorporate functionality for estimating a rotational component due to a turn angle. It is further assumed that the majority of points in the bottom half of the top-view image belong on the ground. As such, the translation of these points can be used to determine the motion of the camera.

Given the above assumptions, the motion estimate for the ground plane is simply the average vertical velocity of all the trackers on the non-transient tracker list 638 that are in the lower half of the current top-view image. If the majority of tracked points in the bottom half of the current top-view image are on the ground plane, the algorithm yields accurate obstacle distances. If, however, the majority of the points in the bottom half of the current top-view images are above the ground plane, the ground velocity estimate would be overshot, and so the calculated obstacle-to-camera distances would also be overshot.

The translation estimation component 608 further processes the trackers on the non-transient list 638 to ensure that reliable distance estimation can be determined from the non-transient trackers. A tracker processing component 640 may process the non-transient trackers in the bottom half of the top-view image to compute the average apparent vertical, and horizontal for the sake of completeness, translation of trackers based on the velocities of the trackers. The processing component 640 also sets two Boolean flags used to describe the ground motion, or velocity, estimate. The first flag is isDefined 642, which is set to true if there are enough trackers in the lower half of the top-view image to give a reliable ground translation estimate. It is set as:

isDefined=(N>10)

Where N is the number of non-transient trackers located in the lower half of the top-view image. N is set to be greater than 10; however, it is contemplated that other values for N, either smaller or larger, could be used.

The second flag is isMoving which is set to true if enough ground motion is observed in the non-transient trackers of the lower half of the top-view image to obtain reliable off-ground point detection. It is set as:

isMoving=($v_y$>10)

Where $v_y$ is the average vertical velocity of the lower half non-transient trackers. The Kalman filter uses a Δt=0.1. As such, setting $v_y$>10 is equivalent to asserting that the vertical velocity is greater than one pixel/frame. Only positive vertical velocities are considered and as such, the detector is only activated when the automobile is reversing. It is noted that 'vertical' refers to movement in the y-axis of the top-view image.

Once the translation estimation component 608 has provided an average vertical ground velocity, as well as setting the flags isMoving and isDefined, the trackers that are tracking points of an off-ground object are determined.

This assumption may be acceptable for certain applications; however another approach is to use a RANSAC (RANdom SAmple Consensus) method to find the translation motion model parameters. The RANSAC method can determine and remove outliers from the motion model to include only trackers following the ground motion.

The off-ground point detector 610 processes the non-transient trackers and determines which ones correspond to off-ground points. The off-ground point detection consists of determining whether each non-transient tracker is on, or off, the ground plane. As described above with reference to FIGS. 2, 3 and 4, off-ground points will have a larger velocity than on-ground points. As such, it may not be possible to reliably detect off-ground points without a reliable ground motion estimate. As such, if the isDefined flag is not set, the off-ground point detection is not performed.

If isDefined is set, off-ground points are determined. Let $v_g$ be the estimated average vertical ground velocity determined by the translation estimation component 608, and v be the vertical velocity 620 of a tracker. Theoretically, it is only necessary for $v_g$>0 in order to determine off-ground points. However, due to noise, $v_g$ should be greater than some threshold. This condition is met when the ground motion isMoving flag is true as defined above.

Theoretically, an off-ground point is indicated by the condition $v/v_g$>1. That is, points off the ground appear to move faster than those on the ground, however, due to the approximate distortion model, and other noise a threshold is used. For example reliable detection of off-ground points has been achieved using $v/v_g$>1.4, which corresponds to detecting points above one half of the camera height. So a tracker is detected as "off-ground" if:

$$\frac{v}{v_g} > 1.4 \qquad (25)$$

Where:
$v_g$ is the estimated ground velocity; and
v is the estimated velocity of the tracker being processed.

The off-ground point detector determines the trackers that correspond to off-ground points which represent an obstacle. With the off-ground trackers determined, the distance to the corresponding obstacles in the real world can be determined.

The distance to object determination component 612 determines a horizontal distance to corresponding objects of each of the determined off-ground points. Consider a point tracker that has been determined as an off-ground point. It has a current vertical velocity v and a location q in the top-view image. The vertical ground velocity is, again, $v_g$. Let H be the homography that transforms top-view image coordinates into world coordinates. This homography is a used by the image transformation component and so is already known. The location of the off-ground point's ground projection, in homogeneous world coordinates, is given by $$P=HQ \qquad (26)$$

Where:

$$Q=[q_x, q_y, 1]^T \qquad (27)$$

The world location of the ground projection is then given by:

$$p = \left[\frac{P_1}{P_3} \ \frac{P_2}{P_3}\right]^T \qquad (28)$$

Then according to the above, the actual distance of the off-ground point to the camera is given by:

$$p' = \frac{v_g}{v} p = \frac{1}{s_z} p \qquad (29)$$

And the distance to the obstacle is given by:

$$d_y = |p'_y| \qquad (30)$$

The distance to object determination component 612 may further return the minimum determined distance to object from all off-ground points. In other words, it returns the nearest obstacle to the camera.

The above has described systems and methods to estimate a distance an object is from a camera. In the above description, only translations of the camera location were considered for clarity of the description. It will be appreciated that the ground motion estimation may also consider rotations, allowing the systems and methods to provide a distance to object estimation when the automobile is turning and backing up. Further, it will be appreciated that other embodiments may be implemented in addition to the specific embodiments described above. An alternative embodiment is described further below. In the below described embodiment, feature points are tracked across 'snapshots'. A snapshot corresponds to a selected frame of the input video from the camera. The snapshots are the frames or images that are used for the 3-dimensional reconstruction of the object locations. By using snapshots, as opposed to tracking features across each captured image, the distance estimation can provide estimations even if the speed of the vehicle is small, since there will be sufficient distance between tracked points.

Figure 9:
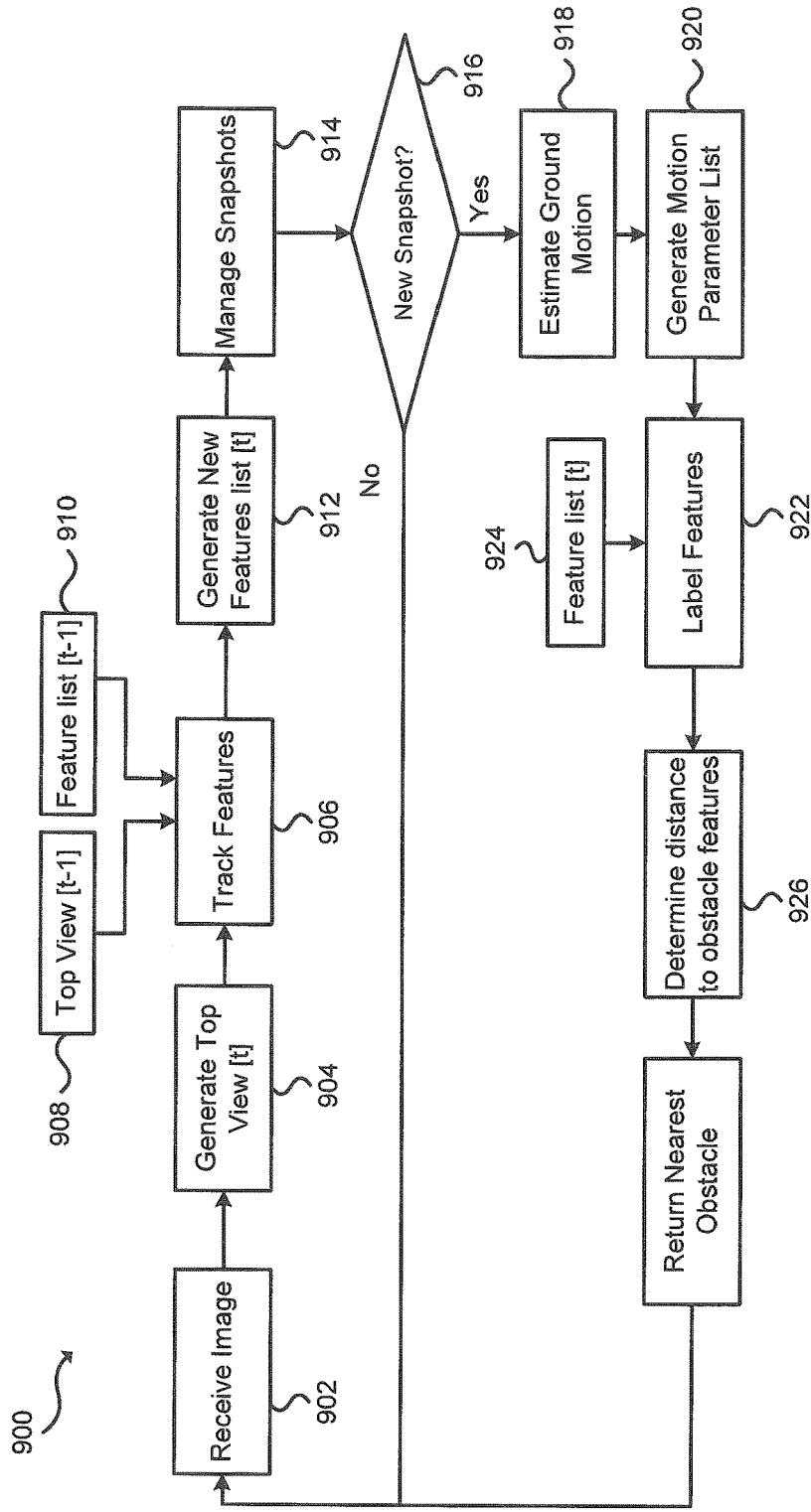
FIG. 9 depicts a method of determining a distance to an obstacle from images captured from a single image capture device.

FIG. 9 depicts a method of determining a distance to an obstacle from images captured from a single image capture device. The method 900 receives an image (902) from the image capture device and generates a corresponding top-view image (904). The top-view image may be generated as described above. Once the current top-view image, is generated features are tracked (906). The features are tracked using the previous top-view image (908) and a list of previous features being tracked (910). The features being tracked are searched for in the new top-view image to track the features' new locations. Once the features are tracked in the current top-view image, a current feature list of tracked features is generated (912). The current feature list may be based on the previous feature list, with noisy or erratic features removed and new features that are appropriate to track added. Once the current feature list is generated, snapshots are managed (914).

Snapshots are managed in order to determine if a new snapshot should be generated from the current top-view image. The determination as to whether or not a snapshot should be generated may be determined based on an average of the motion of the features being tracked between the current top-view image and the previous top-view image. If the average motion of features is above a threshold a new snapshot is generated. The snapshots are used to estimate the ground motion and determine distance estimates for obstacles. It is determined if a new snapshot was generated (916), or more particularly, if a new snapshot subsequent to the initial snapshot was generated. If a new snapshot was not generated (No at 916) the method returns to receive another image (902). If a new snapshot was generated (Yes at 916), then an estimate for the ground motion is determined (918). The ground motion estimate is determined based on the motion of the tracked features across snapshots. The ground motion estimates are used to generate a motion parameter list (920). The motion parameter list describes the parameters of the 2-dimensional rigid transformation between the snapshots. Once the motion parameter list is generated, it is used to label features (922) currently being tracked (924). In particular, the feature labeling determines off-ground features which are labeled as obstacles. Once the off-ground features are labeled, the distance to each of the obstacle features is determined (926), and the distance to the nearest obstacle may be provided (928). The method 900 then receives the next image to process (902).

Figure 10:
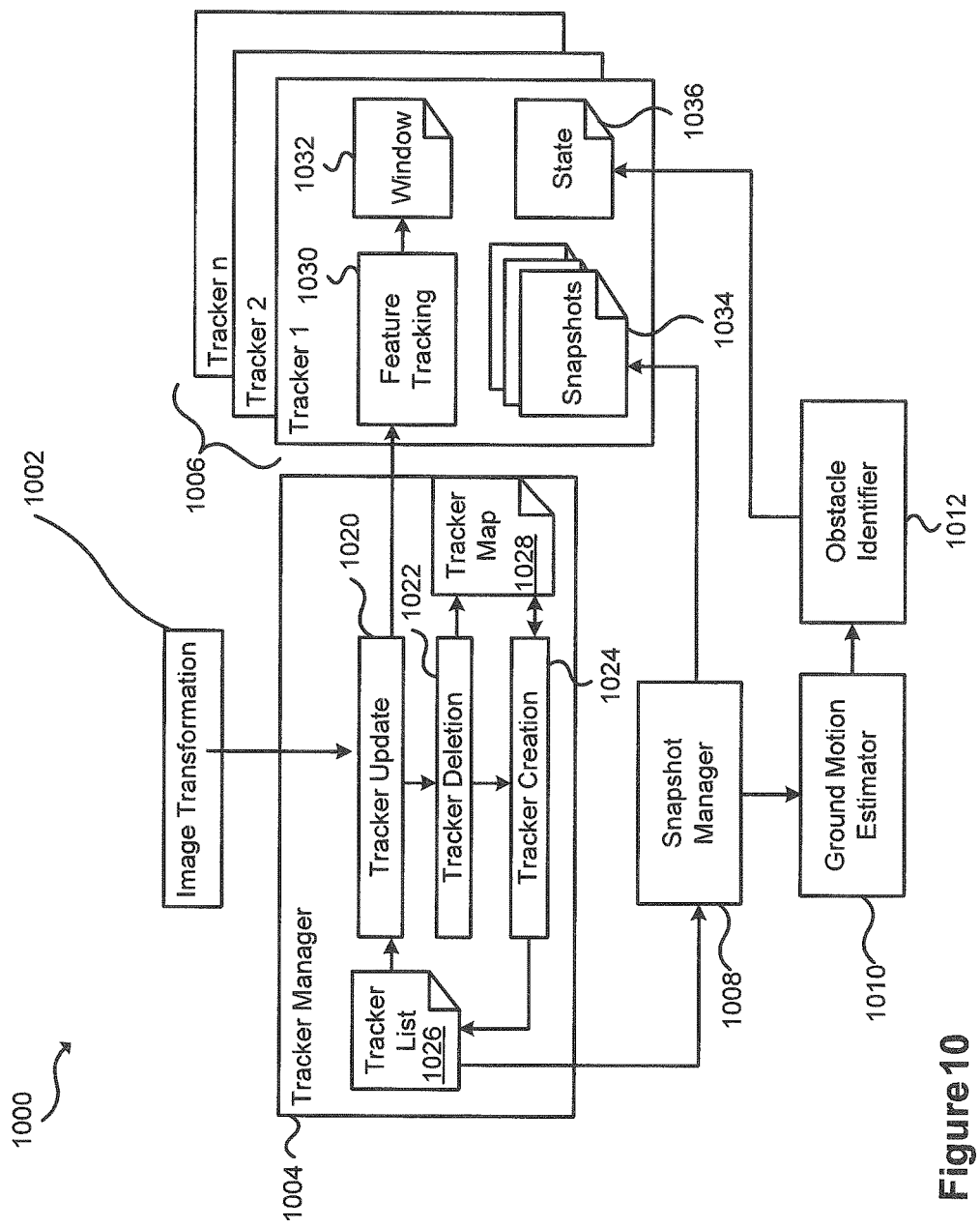
FIG. 10 depicts in a block diagram a still further illustrative embodiment of a system for estimating a distance to an object using a single camera.

FIG. 10 depicts in a block diagram a further illustrative embodiment of a distance estimation component. The distance estimation component 1000 is similar to the distance estimation component 600 however; it includes a snapshot manager and a ground motion estimation module that allows for estimation of ground motion that includes a rotation. The distance estimation system 1000 includes an image transformation component 1002 that receives an image from the image capture device and generates a corresponding top-view image. The top-view images may be generated as described above. The top-view images are provided to a tracker manager component 1004 that locates and tracks features in the top-view images. The tracker manager 1004 may use as plurality of tracker components 1006 for tracking the features. The tracker manager 1004 provides the tracked features to a snapshot manager component 1008 that determines if a new snapshot should be generated from the current top-view image. When new snapshots are generated, ground motion estimation (GME) component (1010) estimates ground motion parameters from the snapshots. The ground motion parameters may be provided to an obstacle identifier component 1012. The obstacle identifier locates each tracked feature in 3-dimensional space and determines if the feature is an obstacle. If the feature is an obstacle the state of the associated tracker can be set accordingly.

As depicted in FIG. 10, the tracker manager component 1004 manages a plurality of trackers 1006. Each of the trackers 1006 may comprise a snapshot vector 1034 which provides the feature location in each snapshot, providing an indication of the motion of the feature across snapshots. The trackers 1006 may also include a state, 1036 which may be set by the obstacle identifier component 1012.

Each of the trackers 1006 may be a template tracker that is used to track a feature across successive images. Each of the trackers 1006 includes a window 1032 which is a region of interest surrounding the feature. The window 1032 is used as a template in the search for the feature in subsequent images. A 15×15 pixel template size is used, although other template sizes may be used. To track a feature from one image to the next, the new image is searched for a patch of pixels that best matches the feature's template from the previous frame. This is done by sliding the template over the new image and computing a metric that quantifies the dissimilarity between the template and the patch in the new image.

A template matching algorithm may be used which takes a template and an image to be searched and returns a comparison image. The comparison image value at (x,y) is the value of the comparison metric between the template and the image, when the top-left corner of the template is at (x,y). The sum of squared differences between pixels may be used as the comparison metric. Formally, for the template T located at (x, y) in the search image I, the sum of squared differences is given by $$R(x, y) = \sum_{x', y'} (T(x', y') - I(x + x', y + y'))^2 \qquad (31)$$

The search image may be limited to a 31×31 pixel window surrounding the template's center in the previous image. This limit may be used not only to avoid a costly search of the entire image but also as an explicit restraint on feature displacements between frames. The location in the comparison image with the smallest value is the new template location.

As described above, trackers 1006 can track a feature in successive images. The tracker manager 1004 manages the plurality of trackers as described further below. The tracker manager maintains a list of current trackers 1026. The tracker manager 1004 performs the tracker management upon receiving each successive image. A tracker update component 1020 updates the trackers on the tracker list 1026. Updating the trackers 1006 causes the trackers to update the location of the feature being tracked, using the successive image.

Once all of the trackers on the list 1026 are updated, a tracker deletion component 1022 removes any noisy tracker, that is, trackers that are moving erratically, as well as trackers that are near the edge of the image. The tracker deletion component 1022 updates a tracker map 1028 which is a mask indicating where trackers do and do not exist. For example, the tracker map 1028 may be an image that is black wherever a trackers window exists and white if no tracker windows occupy the area.

After the tracker deletion and updating of the tracker map, a tracker creation component 1024 processes the top-view image to detect good features to track in the current image, or more particularly, in the portion of the current image where no trackers currently exist as indicated by the tracker map 1028. The detection of good features to track may be provided in various ways. For example OpenCV (Open Source Computer Vision) provides a function OpenCV::goodFeaturesToTrack( ) which determines strong corners, which are treated as features to track, in an image. Some functions for determining features, including OpenCV::goodFeaturesToTrack( ), may provide a 'best' feature to track in an image. These functions may be modified in order to only provide a feature if it is above a certain threshold. In the case of OpenCV::goodFeaturesToTrack( ), the functionality is modified so that the quality criteria for a corner to be accepted is absolute, rather than relative to the best observed corner. This way, if there are no good corners in what remains of the tracker map, no corners are returned, whereas they would be without the modification. For each good tracking feature a new tracker is created and the tracker list 1026 and the tracker map 1028 are updated accordingly.

The tracker manager 1004 provides the updated tracker list 1026 to the snapshot manager 1008, which manages the snapshot creation. Not every pair of images is suitable for 3D reconstruction; the two views must be distinct enough to be able to extract the camera motion from the point correspondences in the two images. Exactly how "distinct" the views must be depends on the geometry of the points in the scene and the tracking precision. Which frames of the video will be used to reconstruct the 3D scene are selected by the snapshot manager. The selected images used to reconstruct the 3D scene are referred to as snapshots.

Conceptually, the rate at which snapshots are generated should be proportional to the vehicle speed. That is, snapshots should be generated more often when the vehicle is moving fast, than when it is moving slowly. In the limit that vehicle stops, no snapshots should be taken at all.

Once enough points are being tracked, an initial snapshot is generated. At each successive frame, the points on the top-view image are assumed to be on the ground, unless they have previously been detected as obstacles, and are transformed to world coordinates on the ground via the homography between the ground plane and the top-view image as described above. For all features that have a displacement, between the current frame and the previous snapshot, above 0.1 m, the average displacement is computed. The reason for this biased average is to avoid incorporating stationary points, which may be due to the vehicle's shadow for example, in the estimate of ground displacement. If this average displacement is above a certain threshold, a new snapshot is generated. An average displacement threshold of 0.2 m is used, although other values may be used.

Points that have been previously detected and identified as obstacles may be included in the average displacement computation by simply projecting them to the ground (i.e. setting their Z coordinate to zero and applying the same homographic transformation between the ground plane and the top-view image. This way, if an obstacle were to fill the field of view, occluding the ground, then vehicle motion can still be estimated.

Once a new snapshot is generated, the ground motion of the vehicle may be estimated and the 3D scene reconstructed, thereby obtaining an estimated distance to any obstacles present.

Once a new snapshot is generated, in addition to the initial snapshot, it is used to determine an estimation of the ground motion. The ground motion estimation provides an estimate of the rigid rotation parameters based on an appropriate set of corresponding features, which may include outliers. In order to estimate the ground motion parameters, pairs of snapshots are used for comparing the motion of tracked features that are selected to provide a good estimate of the ground motion.

In order to achieve robust ground motion estimation it should be determined which snapshots should be compared with which other snapshots. It should also be determined, given two snapshots, which features should be included in the estimation. It should also be determined, given a feature's location on the top-view image, what is its corresponding projection to the ground plane. Once this information is determined, an estimate of the ground motion can be determined.

As images are captured, snapshots are selected with the goal of maintaining a constant ground displacement, for example 0.2 m, from one snapshot to the next. So the faster the vehicle moves, the more frequently snapshots are taken and vice versa.

Let the list of snapshots generated by the Snapshot Selection module be $\{t_0, t_1, \ldots t_k\}$, where $t_i$ is the frame number of the $i^{th}$ snapshot. In order to obtain the 3D location of features in the most recent snapshot $t_k$, the ground motion is estimated between snapshot pairs $\{t_k, t_{k-1}\}$, $\{t_k, t_{k-2}\} \ldots \{t_k, t_0\}$ to obtain a list of ground motion parameters $\{\theta_i, t_{xi}, t_{yi}\}$ for $i=0 \ldots k$. Because the snapshots were taken based on observed ground point displacement, the motion between the current snapshot and snapshots in the past is likely to be sufficiently large to allow the 3D reconstruction.

Consider the pair of snapshots $\{t_A, t_B\}$, where $t_B > t_A$. Of all the currently tracked features, only those that have existed since frame $t_A$ form a GME feature list for the snapshot pair. Each feature of the GME feature list has ground projections $\{g_A^j, g_B^j\}$ in each snapshot between $t_A$ and $t_B$. From this list, only the features which have moved enough between the two images are used for the ground motion estimation. This is to avoid incorporating stationary features in the ground motion estimation. However, it is common that the majority of tracked features are stationary, as glares, shadows, and the vehicle bumper are often tracked. A minimum displacement threshold of 0.1 m may be used to select features for inclusion on the GME feature list.

Once the features have been selected for inclusion on the GME feature list, they are transformed from the feature's top-view coordinates, in pixels, to the ground plane coordinates, in meters. Given a pixel x in the top view image, its projection to the ground g is given by $$g = H_1 x \tag{32}$$

where $H_1$ is the top view-to-ground homography defined in (9). Now, this would be the case if all features were on the ground. However, it is common that the majority of features are above the ground and have been previously detected. In order to make use of these off-ground features, equation (32) is modified when using off-ground features. Equation can be modified to:

$$g = (1/s_z) H_1 x \tag{33}$$

where $s_z$ is given by equation (2).

With the feature locations projected to the ground plane, it is possible to estimate the ground motion parameters. As described above, the ground motion may be modeled as a 2D rigid transformation $\{\theta, t_x, t_y\}$, i.e., a 2D rotation $R_\theta$ and translation t, where $$R_\theta = \begin{bmatrix} \cos\theta & -\sin\theta \\ \sin\theta & \cos\theta \end{bmatrix}, t = \begin{bmatrix} t_x \\ t_y \end{bmatrix} \tag{34}$$

The rigid motion relates the 2D location of a ground point with respect to the vehicle at the current time ($x_A$) to its location at some time in the past ($x_B$):

$$x_B = R_\theta x_1 + t \tag{35}$$

If at least two ground points are tracked, it is possible to estimate the unknown motion parameters $\{\theta, t_x, t_y\}$. Given a set of corresponding ground points $\{g_A^j, g_B^j\}$, where $g_A^j$ is the $j^{th}$ feature's 2D ground coordinates in the current frame and $g_B^j$ is its ground coordinates at some frame in the past. A linear least squares fit on the set of selected features may be performed to obtain an approximate affine transformation $\{\alpha', \beta', t_x', t_y'\}$ of the ground:

$$\{\alpha', \beta', t_x', t_y'\} = \mathrm{argmin}_{\{\alpha,\beta,t_x,t_y\}} \sum_j \left\| g_B^j - \begin{bmatrix} \alpha & -\beta \\ \beta & \alpha \end{bmatrix} g_A^j + \begin{bmatrix} t_x \\ t_y \end{bmatrix} \right\|^2 \tag{36}$$

The affine model may be refined to a true rigid motion model $\{\theta, t_x, t_y\}$ by an iterative Newton-Gauss method, using $\{\cos^{-1}(\alpha'), t_x', t_y'\}$ as the initial guess $$\{\hat{\theta}, \hat{t}_x, \hat{t}_y\} = \mathrm{argmin}_{\{\theta,t_x,t_y\}} \sum_j \left\| g_B^j - \begin{bmatrix} \cos\theta & -\sin\theta \\ \sin\theta & \cos\theta \end{bmatrix} g_A^j + \begin{bmatrix} t_x \\ t_y \end{bmatrix} \right\|^2 \tag{37}$$

The motion estimate routine may be wrapped in a RANSAC process so that outliers, that is, incorrectly tracked points, are not included in the final estimate.

Once the motion parameters have been estimated, the feature location in world coordinates can be determined. Each of the tracked features can be labeled as an off-ground feature or not, and if it is an off-ground feature, the distance to it from the camera location determined. The distance to off-ground features is described; however, it will be appreciated that the distance to on-ground features can also be determined using the process described above.

As described above when the camera undergoes a rigid motion $\{\theta, t_x, t_y\}$ the apparent object location, which is projected onto the ground, moves according to $$s_z x_B = R_\theta (s_z x_A) + t \tag{38}$$

A least squares solution for $s_z$ is given by $$s_z = \frac{t \cdot t}{u \cdot t} \text{ where } u \equiv x_B - R_\theta x_A \tag{39}$$

However, for this expression to be valid, (a) the ground displacement must be sufficient; (b) the feature displacement must be sufficient; and (c) the feature's motion must agree with the ground's motion. These criteria may be expressed mathematically as:

$$(a) \|t\| > \varepsilon \tag{40}$$

$$(b) \|u\| > \varepsilon \tag{41}$$

$$(c) \frac{u \cdot t}{\|u\| \|t\|} > \varepsilon_\theta \tag{42}$$

where $\varepsilon$ and $\varepsilon_\theta$ are system thresholds and the left side of inequality (39) is the cosine of the angle between u and t. The 3D location of the feature, and subsequent obstacle detection, is only done if these criteria are met.

Considering the set of rigid motions $\{\theta_i, t_i\}$ i=1 . . . k and a feature with corresponding points in the top-view snapshots of $\{x_0, x_1, \ldots x_k\}$, the least squares solution for $s_z$ with respect to all motions is:

$$s_z = \frac{\sum_{i=1}^{k} (t_i \cdot t_i) \delta_i}{\sum_{i=1}^{k} (u_i \cdot t_i) \delta_i} \tag{43}$$

where $u_i \equiv x_i - R_{\theta_i} x_0$ and $\delta_i = 1$ if the criteria noted above are met, and zero otherwise. To increase the robustness of the estimate for $s_z$ a RANSAC process may remove outliers from the estimation.

The location of the point in the vehicle coordinate system is then given by $$P = \begin{bmatrix} X \\ Y \\ Z \end{bmatrix} = \begin{bmatrix} x/s_z \\ y/s_z \\ h(1 - 1/s_z) \end{bmatrix} \tag{44}$$

The features may be processed to be labeled off-ground features as obstacles. An obstacle may be considered as an above-ground feature that is within a collision region with respect to the automobile. It will be appreciated that obstacles can be defined in other ways as well. This region may be defined by a volume of interested behind the vehicle. Due to noise and tracking errors, there is a practical limit as to how sensitive detecting such features can be. A threshold $s_zMax=1.4$ is defined and an obstacles is defined as any feature with $s_z>s_zMax$. The threshold $s_zMax=1.4$ translates to detecting obstacles with a height greater than 0.28 times the camera height. So, for example, for a camera 1 m off the ground, obstacles of 28 cm or higher can be detected. Other thresholds for $s_zMax$ may be used.

Each feature labeled an obstacle has a computed 3D location $P=[X,Y,Z]^T$ in the vehicle coordinate system. The distance of an obstacle to the vehicle is $\|Y\|$, if the vehicle's bumper is placed at the origin. The minimum determined distance to object from all obstacles may be returned. In other words, it returns the nearest obstacle to the camera.

The systems and methods described above provide the ability to provide an estimate of the distance from a camera to an obstacle using the images captured from a single camera. The system and methods described herein have been described with reference to various examples. It will be appreciated that components from the various examples may be combined together, or components of the examples removed or modified. As described, the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A method for determining a distance to an obstacle from a camera mounted to an automobile, the method comprising:
   tracking a plurality of image features across two or more successive images captured by the camera;
   when an average of a ground motion estimate is above a threshold,
      generating top-view images by transforming the camera images to appear to have been taken from above, and
      determining a ground motion estimate based on vertical motion of a plurality of the tracked image features that are in a lower half of the top-view images;
      identifying a plurality of the tracked plurality of image features as offground features based on the ground motion estimate and respective motion of the plurality of image features tracked across two or more of the top-view images, each of the plurality of identified off-ground features corresponding to at least a portion of an object above or below a ground surface;
      calculating for each of the plurality of off-ground features of the plurality of image features a distance from the portion of the object corresponding to the respective off-ground feature to the camera based on motion of the respective off-ground feature in the top-view image and the ground motion estimate.

2. The method of claim 1, further comprising:
   identifying a most recent one of the successive images as a snapshot,
   determining if an average displacement of tracked image features between a next one of the successive images and the snapshot is above another threshold;
   identifying the next one of the successive images as a new snapshot when the average displacement is above the other threshold; and
   determining the ground motion estimate using the new snapshot when the new snapshot is identified.

3. The method of claim 2, wherein the average displacement is determined using tracked image features with a displacement above a minimum threshold.

4. The method of claim 2, further comprising:
   determining the ground motion estimate based on motion of a plurality of tracked image features across two or more successive snapshots.

5. The method of claim 4, wherein determining the ground motion estimate comprises:
   determining an estimate of ground motion parameters describing motion between a current snapshot and one or more previous snapshots, the ground motion parameters defining a 2-dimensional rigid transformation based on $\{\theta, tx, ty\}$,
   wherein:
      $\theta$ is a rotation of the camera;
      tx is a translation of the camera in a first direction; and
      ty is a translation of the camera in a second direction perpendicular to the first direction.

6. The method of claim 5, wherein determining an estimate of the ground motion parameters comprises:
   approximating ground motion as an approximate affine transformation using a linear least squares fit of the plurality of tracked image features used to determine the ground motion estimate; and
   refining the approximate affine transformation using an iterative Newton: Gauss method.

7. A processor for executing instructions stored in memory, the processor for determining a distance to an obstacle from a camera mounted to an automobile, the instructions configuring the processor to:
   generate top-view images from camera images by transforming the camera images to appear to have been taken from above;
   track a plurality of image features across two or more successive top-view images when an average of a ground motion estimate for the top-view images is above a threshold;
   determine the ground motion estimate based on motion of a plurality of the tracked image features across the two or more successive top-view images;
   identify a plurality of the tracked plurality of image features as off-ground features based on the ground motion estimate and respective motion of the plurality of image features tracked across the two or more successive top-view images, each of the plurality of identified off-ground features corresponding to at least a portion of an object above or below a ground surface; and
   for each of the plurality of off-ground features of the plurality of image features, calculate a distance from the portion of the object corresponding to the respective off-ground feature to the camera based on motion of the respective off-ground feature in the top view images and the ground motion estimate.

8. The processor of claim 7, wherein the instructions when executed by the processor, further configuring the processor to for each image captured by the camera, generate the corresponding successive image by projecting the image to the ground-plane.

9. The processor of claim 7, wherein the instructions when executed by the processor, further configuring the processor to:
  generate one or more snapshots from one or more of the successive top-view images.

10. The processor of claim 9, wherein generation of a new snapshot comprises:
  determining if an average displacement of tracked image features between a next one of the successive images and a latest snapshot is above a threshold; and
  generating the new snapshot of the next one of the successive top-view image when the average displacement is above a threshold.

11. The processor of claim 10, wherein the average displacement is determined using tracked image features with a displacement above a minimum threshold.

12. The processor of claim 7 wherein determining the ground motion estimate comprises:
  determining an estimate of ground motion parameters describing motion between a current snapshot and one or more previous snapshots, the ground motion parameters defining a 2-dimensional rigid transformation based on $\{\theta, tx, ty\}$,
  wherein:
  $\theta$ is a rotation of the camera;
  tx is a translation of the camera in a first direction; and
  ty is a translation of the camera in a second direction perpendicular to the first direction.

13. The processor of claim 12, wherein determining an estimate of the ground motion parameters comprises:
  approximating ground motion as an approximate affine transformation using a linear least squares fit of the plurality of tracked image features used to determine the ground motion estimate; and
  refining the approximate affine transformation using an iterative Newton-Gauss method.

14. A system for determining a distance to an obstacle, the system comprising:
  a camera to be mounted to an automobile;
  a memory for storing instructions; and
  a processor for executing instructions, the processor for determining a distance to an obstacle from the camera when mounted to the automobile, the instructions configuring the system to:
    track a plurality of image features across two or more successive images;
    once a predetermined number of the plurality of image features are tracked and there is at least a predetermined amount of displacement between the plurality of tracked image features in the two or more successive images:
      determine a ground motion estimate based on motion of the plurality of tracked image features being tracked across the two of the successive images;
      identify a plurality of the tracked plurality of image features as offground features based on the ground motion estimate and respective motion of the plurality of image features tracked across two or more successive images, each of the plurality of identified off-ground features corresponding to at least a portion of an object above or below a ground surface; and
      for each of the plurality of off-ground features of the plurality of image features, calculate a distance from the portion of the object corresponding to the respective off-ground feature to the camera based on motion of the respective off-ground feature in the images captured by the camera projected to a ground-plane and the ground motion estimate.

15. The processor of claim 8, wherein the instructions when executed by the processor, further configuring the processor to:
  generate one or more snapshots from one or more of the successive images.

16. The processor of claim 11, wherein the instructions when executed by the processor, further configuring the processor to determine the ground motion estimate based on motion of a plurality of tracked image features across two or more successive snapshots.

17. The method of claim 1, further comprising:
  identifying one of the successive images as a snapshot for use in determining the ground motion estimate.

18. The method of claim 3, further comprising:
  determining the ground motion estimate based on motion of a plurality of tracked image features across two or more successive snapshots.

* * * * *